Aug. 13, 1940.  L. E. YEOMAN  2,211,682
TOOL HANDLE.
Filed Jan. 26, 1939  2 Sheets-Sheet 1
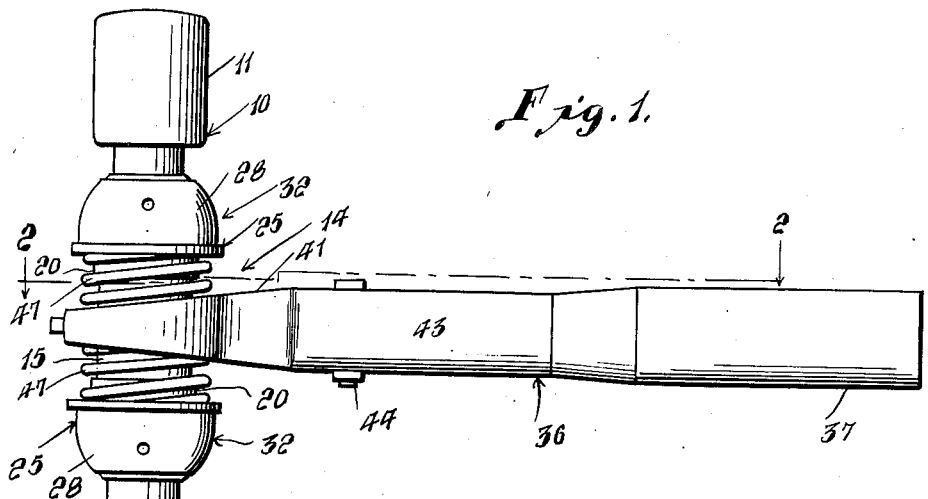
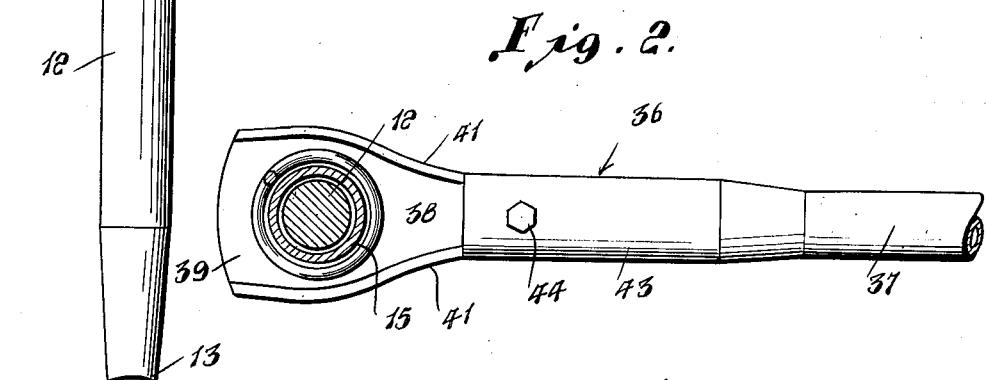
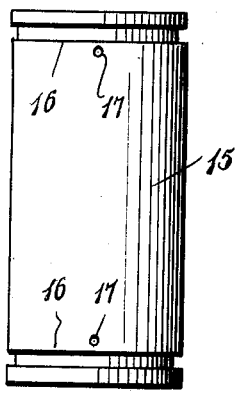
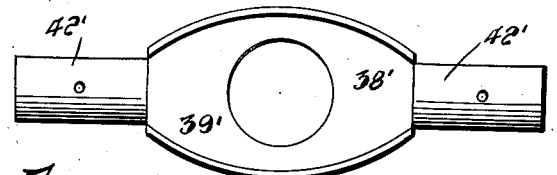
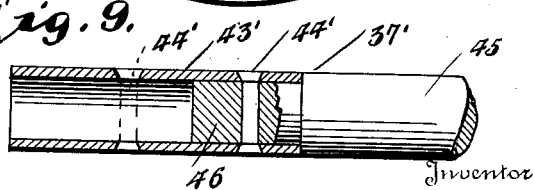
Inventor
Loyd E. Yeoman
By L. F. Randolph
Attorney Aug. 13, 1940.    L. E. YEOMAN    2,211,682
TOOL HANDLE
Filed Jan. 26, 1939    2 Sheets-Sheet 2
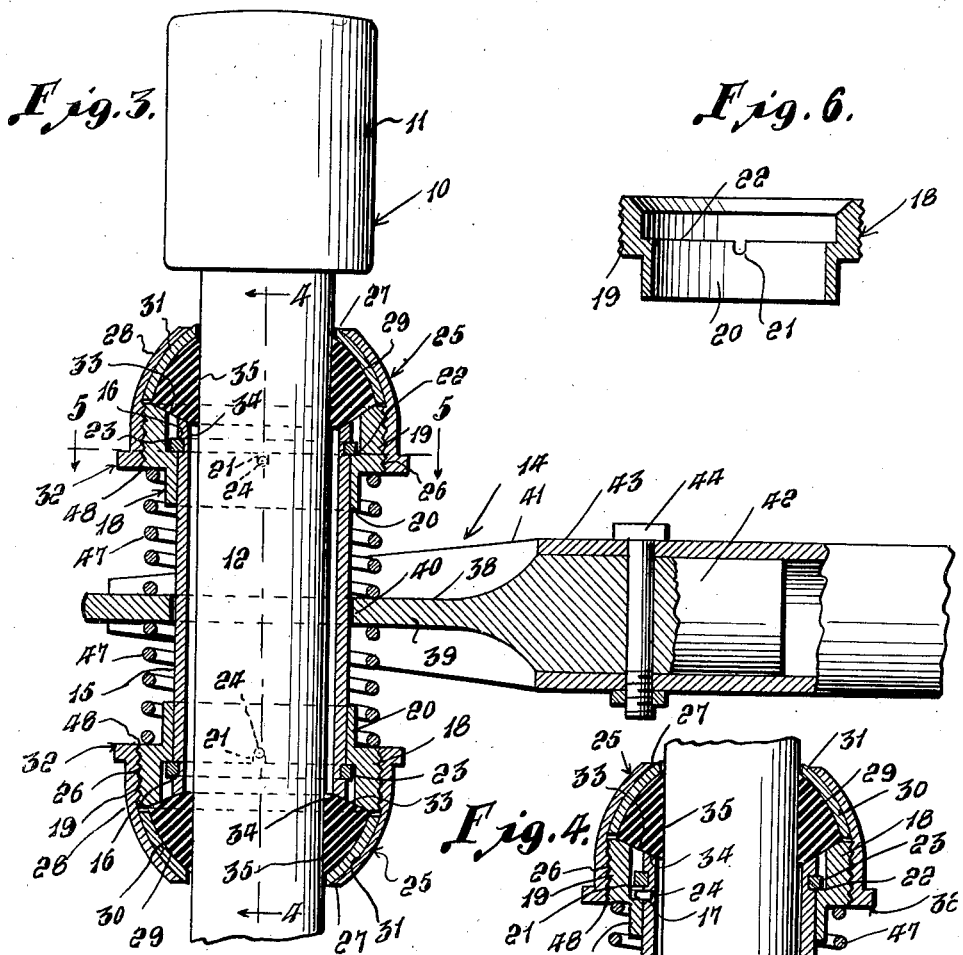
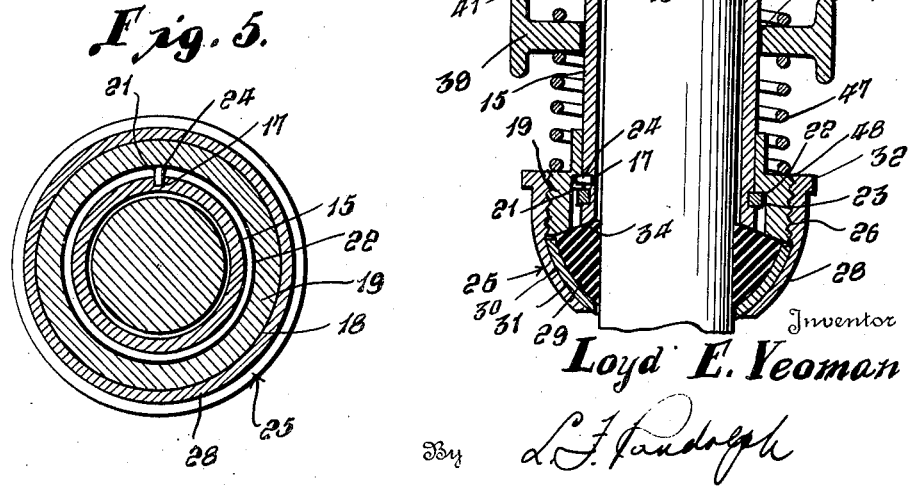
Inventor
Loyd E. Yeoman
By L. F. Randolph
Attorney Patented Aug. 13, 1940

2,211,682

UNITED STATES PATENT OFFICE 2,211,682

TOOL HANDLE

Loyd E. Yeoman, Broken Bow, Nebr., assignor of one-fourth to Harvey C. Leui, Broken Bow, Nebr.

Application January 26, 1939, Serial No. 252,977

7 Claims. (Cl. 81—1)

This invention relates to an improved tool handle for driven tools such as bolt and rivet removers, chisels, punches, rock drills and the like which are adapted to be driven by any type of hammer.

More particularly, it is an aim of this invention to provide a handle for driven tools provided with cushioning means for absorbing the shock of the hammer or other driving means so that the shock will not be imparted from the tool shank to the handle.

It is a particular object of this invention to provide a shock absorbing or cushioning tool handle having means whereby it may be detachably mounted on the shank of a tool thereby adapting the handle for use with a plurality of driven tools.

Still a further object of the invention is to provide a tool handle including a portion adapted to removably and frictionally engage a tool shank and provided with abutment means at its ends forming seats for remote ends of a pair of springs between the adjacent ends of which the handle portion is adapted to be mounted to thereby yieldably mount the handle portion relatively to the driven tool.

Other objects and advantages of the invention will hereinafter become more fully apparent from the following description of the drawings, which illustrate a preferred embodiment thereof, and wherein:

Figure 1 is a side elevational view showing the invention fully assembled and connected to the shank of a driven tool, Figure 2 is a horizontal sectional view taken along the line 2—2 of Figure 1, Figure 3 is an enlarged fragmentary vertical central sectional view partly in elevation of the invention as seen in Figure 1, Figure 4 is a vertical sectional view taken along the line 4—4 of Figure 3, Figure 5 is a horizontal sectional view taken along the line 5—5 of Figure 3, Figure 6 is a vertical sectional view of one of the bushings, Figure 7 is a side elevational view of the sleeve, Figure 8 is a plan view of a slightly modified form of the attaching portion of the handle, and Figure 9 is a fragmentary side elevational view partly in section of a slightly modified form of the gripping portion of the handle.

Referring more particularly to the drawings, wherein like reference characters designate like or corresponding parts throughout the different views, 10 designates generally a driven tool of any desired type and for any desired purpose which as illustrated, is in the form of a rivet or bolt head remover, and comprises a head 11, a shank 12 and a cutting edge 13. Tool 10 is shown merely to illustrate the application of the shock absorbing tool handle, designated generally 14, and comprising this invention.

The shock absorbing tool handle 14, as best illustrated in Figure 3, includes a sleeve 15 provided adjacent each end thereof with an annular groove 16 and a recess 17 adjacent each groove, said recesses 17 being disposed between the two grooves 16. A bushing, designated generally 18, is adapted to be removably mounted on each end of the sleeve 15. The bushings 18, as best illustrated in Figure 6, include the enlarged externally threaded portion 19 having at one end the inwardly offset outwardly projecting annular flange or sleeve 20 provided with the notch 21 formed in the shoulder 22, which is formed between the interior of the portion 19 and the inner secured end of the flange or sleeve 20. The flanges or sleeves 20 of the bushings 18 are adapted to slidably engage the exterior of the sleeve 15 with one disposed at each end thereof. A pair of semi-circular keys 23 are adapted to be positioned in each of the grooves 16 after the bushings 18 have been inserted thereon to engage against the shoulders 22 to prevent the bushings from being removed from the sleeve. Keys 23 are rectangular in cross section and are of sufficient thickness so that when they are engaged by the shoulders 22 they will be held in engagement with the grooves 16 by the inner wall of the enlarged portion 19. A stud 24 engages each of the recesses 17 and projects outwardly therefrom to engage the notch 21 of each of the bushings 18 when its shoulder 22 is in engagement with the keys 23 to thereby hold the bushings 18 from being turned relatively to sleeve 15.

A cap, designated generally 25 is provided with an enlarged internally threaded end 26 and a restricted opening 27 in its opposite end. The side wall 28 of the cap 25 is arcuately shaped in cross section to converge from the enlarged open end 26 to the restricted open end 27. The cap 25 is adapted to be connected to each of the bushings 18 with the internally threaded end 26 thereof engaging the externally threaded enlarged end 19 of one of the bushings 18, and the restricted open end 27, which is remotely disposed relatively to the sleeve 15, loosely surrounding the shank 12 of the tool 10. Each of the caps 25 provide a housing for a resilient ring 29, formed of rubber or the like, which are adapted to frictionally engage the shank 12 and which are provided with the outer walls 30 corresponding in shape to the walls 28 of the caps 25. Disposed between each of the walls 30 and 28 is an arcuately shaped anti-friction washer 31 which is shaped to correspond to the walls 28 and 30.

The bushing 18, cap 25, ring 29 and washer 31 which is mounted on each end of the sleeve 15 combine to form a removable abutment designated generally 32.

The enlarged end which constitutes the top edge of each of the rings 29 is bevelled outwardly and downwardly as indicated at 33 and the ends of the sleeve 15 are bevelled along their inner sides at 34 as are also the free ends of the bushings 18, as indicated at 35, to rest flush against the top edges 33 of the rings 29 so that when caps 25 are tightened relatively to the bushings 18, the bushings 18 and the ends of the sleeve 15 will be drawn inwardly of the caps 25 and into engagement with the rings 29 to compress them so that they will be drawn into tight frictional engagement with the shank 12 of the tool 10.

As best seen in Figures 1 and 2, the handle designated generally 36 includes a gripping portion 37 at one end and an attaching portion 38 at the other end. The attaching portion 38 includes a plate 39 which is enlarged at one end and which tapers toward its opposite end and is provided with an opening 40 adjacent said enlarged end, as best illustrated in Figures 3 and 4. Flanges 41 project upwardly and downwardly from the longitudinal edges of the plate 39. Plate 39 at its restricted end is provided with an outwardly projecting shank 42 which is adapted to be removably mounted in the socket portion 43, which constitutes one end of the gripping portion 37 and which is shaped to snugly engage the shank 42 which is removably mounted therein by means of the fastening 44. Socket portion 43 is preferably cylindrical but may be of any other desired shape to correspond to the shank 42 whereas the opposite gripping end of the gripping portion 37 is preferably oval shaped in cross section so as to be comfortably held in the hand.

In Figure 8, an attaching portion 38′ is shown provided with a plate 39′ having corresponding tapered ends from each of which project a shank 42′ each of which is adapted to be connected to a gripping portion 37 where the tool 10 is of sufficient size to require two men to hold the tool while it is being driven. In Figure 9, the gripping portion designated generally 37′ includes a wooden handle 45, which is oval shaped in cross section, and which is provided at one end with a reduced shank 46 corresponding in size and shape to either the shank 42 or the shank 42′ and which is adapted to be removably mounted in one end of a socket or sleeve 43′ by means of a fastening 44′. A second fastening 44′ is provided adjacent the opposite end of the sleeve or socket 43′ to receive either the shank 42 or one of the shanks 42′ so that in this form the gripping portion 37′ comprises the detachable sections 43′ and 45.

Opening 40 of connecting portion 38 is adapted to loosely engage around the sleeve 15, as best seen in Figures 3 and 4, and is adapted to be held intermediate of the abutments 32 by means of the cushioning or expansion coil springs 47 which are disposed one on each side of the attaching portion 38 and between said portion and one of the abutments 32. The remote ends of the coil spring 47 seat on the shoulder portions 48 of the abutments 32 whereas the adjacent ends of the springs 47 seat against the opposite sides of the plate 39 to thereby resiliently and yieldably mount the handle 36 relatively to the tool 10 and relatively to the sleeve 15 and abutments 32 so that when the head 11 is struck to drive the tool 10 the springs 47 will take up the shock to prevent it from being transmitted to the gripping portion 37.

The handle 14 as a whole may be ordinarily removed from one tool 10 and applied to another without dissembling the abutments 32 by merely loosening caps 25 to release the tension on the rings 29 so that they can be moved relatively to shank 12. The device as a whole may be dissembled by first removing caps 25 after which the washers 30 and rings 29 may be removed. One of the bushings 18 is then pressed inwardly against the tension of the two springs 47 to release the two key members 23 and the stud 24 which is supporting this bushing, after which the bushing can be removed to release its spring 47 which can then be removed to release the attaching portion 38 from the handle 36.

Obviously the size and shape of the parts may be varied depending upon the size and shape of the tool 10, and various other modifications and changes in the construction and arrangement of the parts forming the invention are contemplated and may obviously be resorted to, and the right is therefor expressly reserved to make such variations and changes as do not depart from the spirit and scope of the invention as hereinafter defined by the appended claims.

I claim as my invention:

1. A device of the class described comprising a tool having a shank provided with spaced abutments, a handle having an opening at one end loosely mounted on the shank between the abutments, and expansion coil springs disposed between the abutments and handle each having an end engaging a side of the handle and an end engaging an abutment to yieldably position the handle relatively to the abutments.

2. A device of the class described comprising a sleeve adapted to be loosely mounted on the shank of a tool, said sleeve being provided with demountable enlarged end members having means for frictionally engaging the shank, a handle having an opening at one end to loosely engage said sleeve, and springs disposed between said handle and end members.

3. A shock absorbing tool handle comprising a sleeve adapted to loosely engage the shank of a tool, abutment members formed on the ends of the sleeve and containing resilient rings for frictionally engaging the shank, a handle having an opening at one end for loosely engaging the sleeve, cushioning coil springs surrounding the sleeve and disposed between the handle and the abutments, each of said springs having an end engaging a side of the handle and an opposite end engaging an abutment.

4. A shock absorbing handle for driven tools comprising a sleeve adapted to loosely engage the shank of a tool, abutment members on the ends of said sleeve having yieldable washers to frictionally engage the shank, cushioning coil springs surrounding the shank and having their remote ends engaging the adjacent faces of said abutments, and a handle having an attaching portion provided with an opening for slidably and rotatably engaging said sleeve, said attaching portion being located between the adjacent ends of the springs and engaged thereby on opposite sides, said handle including a gripping section having means for detachably connecting it to said attaching portion.

5. A shock absorbing tool handle comprising a sleeve adapted to loosely engage the shank of a driven tool, abutments detachably mounted on the ends of said sleeve, said abutments being provided with resilient washers for frictionally engaging the tool shank, a handle having an opening in one end for loosely engaging said sleeve, and expansion coil springs surrounding said sleeve and disposed between said abutments and the handle for yieldably mounting it relatively to the tool shank.

6. A device as in claim 5, said abutments each comprising a bushing including an enlarged externally threaded portion and an inwardly offset annular flange at one end for slidably engaging said sleeve, means for keying said flange portion to the sleeve, a cap having an opening at one end to receive said shank and being internally threaded at its opposite end to engage the threaded portion of said bushing, said cap enclosing said washer, and a bevelled ring disposed between the cap and washer.

7. In a shock absorbing tool handle, a sleeve adapted to loosely engage the shank of a tool, abutments detachably mounted on the ends of said sleeve, each of said abutments being provided with a resilient ring to frictionally engage the tool shank, said abutments being adjustable relatively to the sleeve to adjust the frictional engagement between the rings and tool shank, a handle having an opening at one end to loosely engage said sleeve, and coil springs disposed between said end and the abutments for resiliently mounting said end relatively to the tool shank.

LOYD E. YEOMAN.